United States Patent [19]
Shiraishi

[11] Patent Number: 5,495,159
[45] Date of Patent: Feb. 27, 1996

[54] CHARGING APPARATUS FOR DRIVERLESS TRANSPORTING VEHICLE

[75] Inventor: Itsuo Shiraishi, Ebina, Japan

[73] Assignee: Yugen Kaisha Takuma Seiko, Kanagawa, Japan

[21] Appl. No.: 207,212

[22] Filed: Mar. 8, 1994

[30] Foreign Application Priority Data

Mar. 9, 1993 [JP] Japan ................. 5-075403

[51] Int. Cl.⁶ ............... B64C 13/18; H01R 25/00
[52] U.S. Cl. ............... 318/587; 318/580; 191/22 C; 439/111; 439/919
[58] Field of Search .................. 318/580, 587, 318/568.12; 180/168, 167, 290, 286, 68.5, 169; 364/424.02, 424.01, 513; 191/1 R, 22 R, 32, 22 C, 45 R; 439/34, 110, 111, 919

[56] References Cited

U.S. PATENT DOCUMENTS

| | | | |
|---|---|---|---|
| 4,902,948 | 2/1990 | Sherman et al. | 318/580 |
| 4,956,777 | 9/1990 | Cearley et al. | 364/424.02 |
| 4,982,329 | 1/1991 | Tabata et al. | 318/587 |
| 5,014,181 | 5/1991 | Valencic et al. | 180/286 |
| 5,091,855 | 2/1992 | Umehara et al. | 364/424.02 |

Primary Examiner—John W. Cabeca
Attorney, Agent, or Firm—Browdy and Niemark

[57] ABSTRACT

A charging apparatus of driverless transporting vehicle comprises a power unit, an electrode assembly connected to the power unit and sildably anlong a predetermined direction, a motor for sliding the assembly, an electrode unit rotatably journalled with assembly by a shaft and contactable with charging terminal of the vehicle and a spring for rotating the electrode unit around the shaft and extruding it outside. Wherein when the assembly slides, the electrode unit comes in contact with the terminal, further when the assembly slides, the electrodo unit comes in contact with the terminal, rotates around the shaft against the spring and keeps its contact with the terminal.

4 Claims, 9 Drawing Sheets

CHARGING APPARATUS FOR DRIVERLESS TRANSPORTING VEHICLE

BACKGROUND OF THE INVENTION

1. Technical Field of the Invention

The present invention relates to a charging apparatus for driverless transporting vehicle adapted to automatically be driven along optical or magnetic guide tape installed on floor.

2. Prior Art

According to the conventinally known driverless transporting vehicles, they have a battery and wheels driven by a motor and automatically run along a guide tape. When volume of charged electricity of the battery lowers after an automatic long running of the vehicle, the battery must be taken off from the vehicle, battery is connected to a charging apparatus to charge it, and the battery is mounted on the vehicle after charging is over. It is noted that such working above has been done with hands raising a cost of operation of the conventional driverless transporting vehicles.

Comparing to such known driverless transporting vehicles, there are other conventional vehicles respectively provided with an automatic charging apparatus enabling to charge the battery while it is on the vehicle without taking off it from the vehicle. The automatic charging apparatus (FIG. 17) has a power unit A connected to commercial power source, electrode assembly B connected to the power unit A and slidable along a predetermined direction, a motor C for sliding the electrode assembly B, electrode unit F mounted on a front end of the electrode assembly B and enabled to contact with charging terminal E of the driverless vehicle D, and a spring G placed between the electrode unit F and electrode assembly B for protruding outside the electrode unit F. When the vehicle having low electricity of the battery automatically stops at a place of the charging apparatus, the motor C rotates to slide the electrode assembly B toward the vehicle, electrode unit F contacts elastically to the terminal E with the resilient spring G, and the battery is automatically charged.

According to a problem of the conventional automatic charging apparatus, it is necessary to manually remove dirt and carbon dust attached on the electrode unit F or terminal E. That is, the electrode unit F is simply kept in being pressed onto the terminal E, so that when dirt and carbon dust are attached or adhered once to surfaces of the electrode F and terminal E, it is very difficult to remove dirt and dust or clarify the electrode F and terminal E.

Accordingly, it is the purpose of the present invention to provide a charging apparatus for diverless transporting vehicles in which apparatus when electrode unit comes in contact with charging terminal, these unit and terminal mutually rub with each other to clarify them, so that dirt and carbon dust are restricted from attaching to them or removed from them.

SUMMARY OF THE INVENTION

The purpose of the present invention is attached by the charging apparatus for driverless transporting vehicles adapted to automatically run along a guide tape on floor, and which apparatus comprising a power unit, and electrode assembly electrically connected to the power unit and slidable along a predetermined direction, a motor for sliding the electrode assembly, an electrode unit rotatably journalled with the electrode assembly through a first axis and enabled to come in contact with charging terminal of the vehicle, and a spring for rotating the electrode unit around the first axis to protrude it outside, wherein when the electrode assembly slides by the motor, the electrode unit comes in contact with the charging terminal of the vehicle, and when the electrode assembly slides, the electrode unit abuts against the terminal rotating around the first shaft against elasticity of the spring and keeps its contact with the terminal.

DETAILED EXPLANATION OF THE EMBODIMENT

Figure 1:
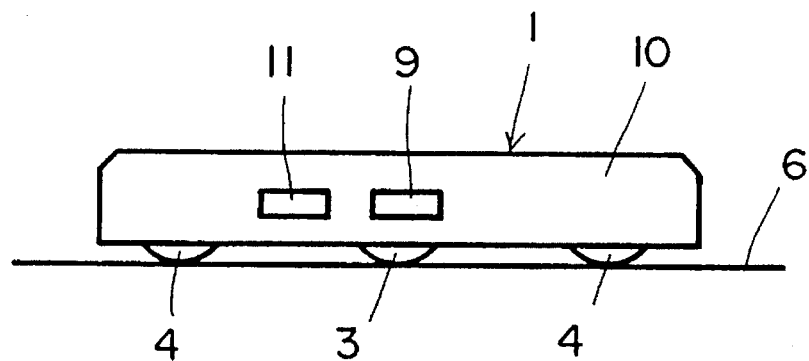
FIG. 1 is a side elevation of the driverless transporting vehicle.

One of the embodiments of charging apparatus for driverless transporting vehicles will be explained with reference to the accompanying drawings. The vehicle 1 has a short box shape as shown in FIG. 1 and a top flat surface on which luggages and goods are placed. A lower space of the vehicle 1 contains a motor 2, a pair of driven wheels 3 driven by the motor 2, free supporting wheels 4, a battery 5, and an optical or magnetic sensor 8 detecting optically or magnetically guide tape 7 placed on floor 6. The vehicle 1 is constructed to automatically trace the guide tape 7 and run along the tape 7. The construction of the driverless transporting vehicle mentioned above is well known.

Figure 2:
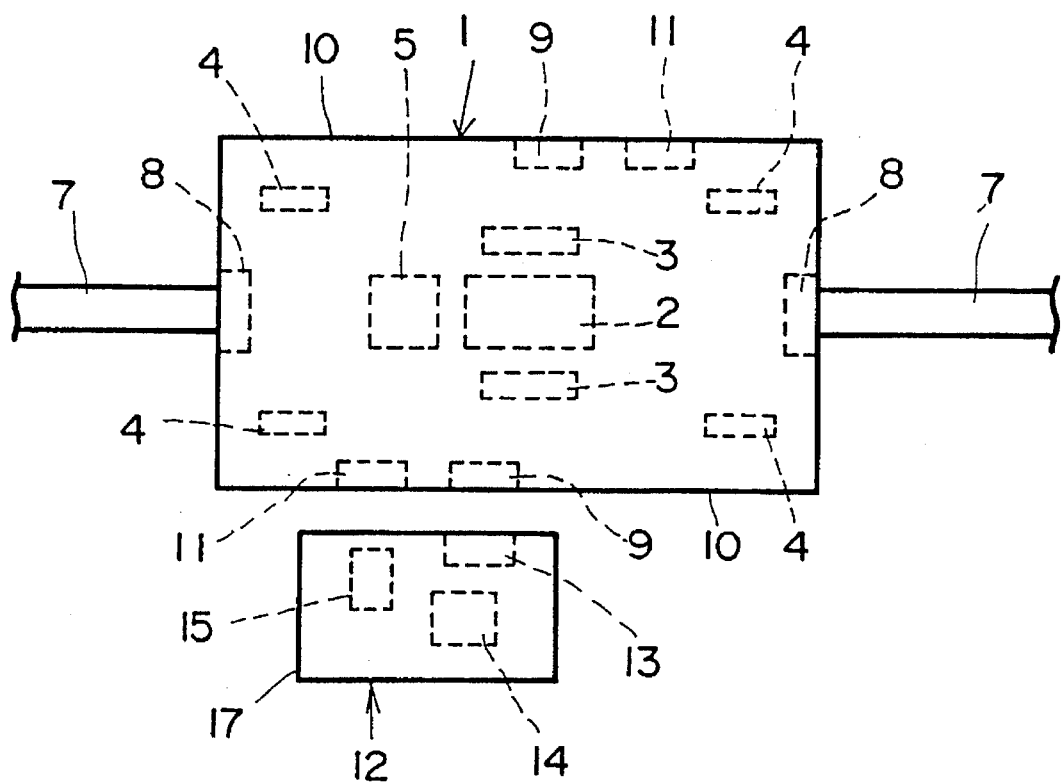
FIG. 2 is a plan view of the vehicle and the charging apparatus according to the present invention.

According to the present invention, the charging apparatus 12 for charging The battery 5 by electricity of commercial power source is mounted on the floor 6 at a predetermined position. The charging unit 12 has a power unit 14 consisting of transformer and rectifier and the like, and a movable electrode assembly 15 connected to the power unit 14. As shown in FIG. 2, both the vehicle 1 and charging apparatus 12 have communications 9 and 13 for data communicating by light beam or electric wave. When the charging apparatus 12 detects low level of electricity in the battery 5 through the data communication, the electrode assembly 15 slides toward the vehicle 1 and comes in contact with the charging terminal 11 placed on a side wall 10 of the vehicle 1 resulting in start of charging.

The charging apparatus 12 of the present invention will be described in more detail with reference to FIG. 3 to FIG. 16. The motor 16 for sliding the electrode assembly 15 is secured to a frame body 17 of the charging apparatus 12. A rotary arm 19 is secured to an output shaft 18 of the motor 16 and one end of a link 21 is journalled with end of the rotary arm 19 by a pin 20. As shown in FIG. 4, the link 21 has a shape of square pillar. The link 21 has a concave portion 22 formed at its front end. The link 21 has oval holes 23 respectively formed on both top and bottom sides of the front end of the link. The oval hole 23 of the link 21 extends along up-and-down direction through the concave portion 22, and through which concave portion a longitudinal shaft 24 passes.

The concave portion 22 contains a coil spring 25. The spring urges the shaft 24 toward front end of the link 21. It is noted that FIG. 4 shows a slide member 26 placed between the spring 25 and the shaft 24.

Figure 3:
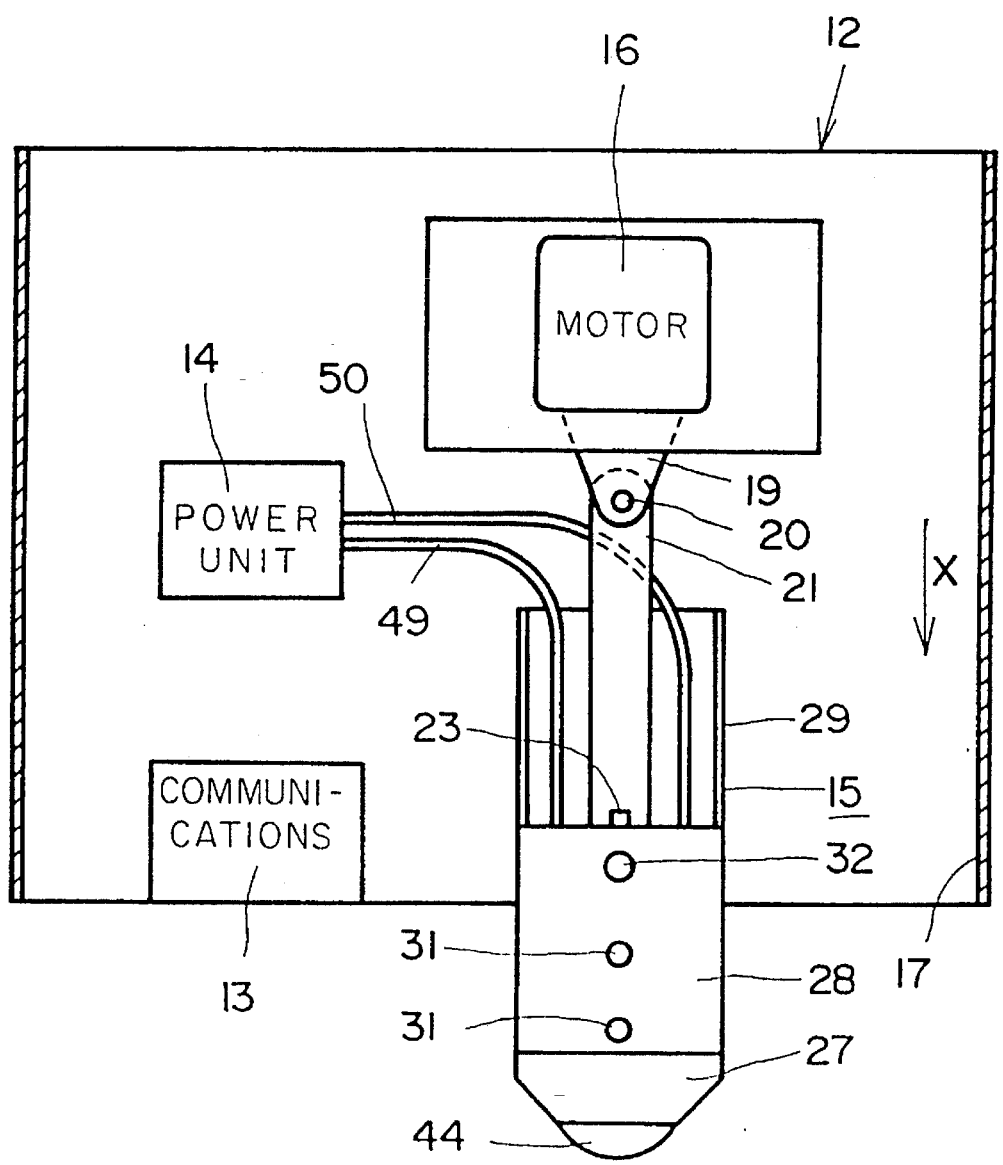
FIG. 3 is a transversal sectional and plan view of the charging apparatus.
Figure 4:
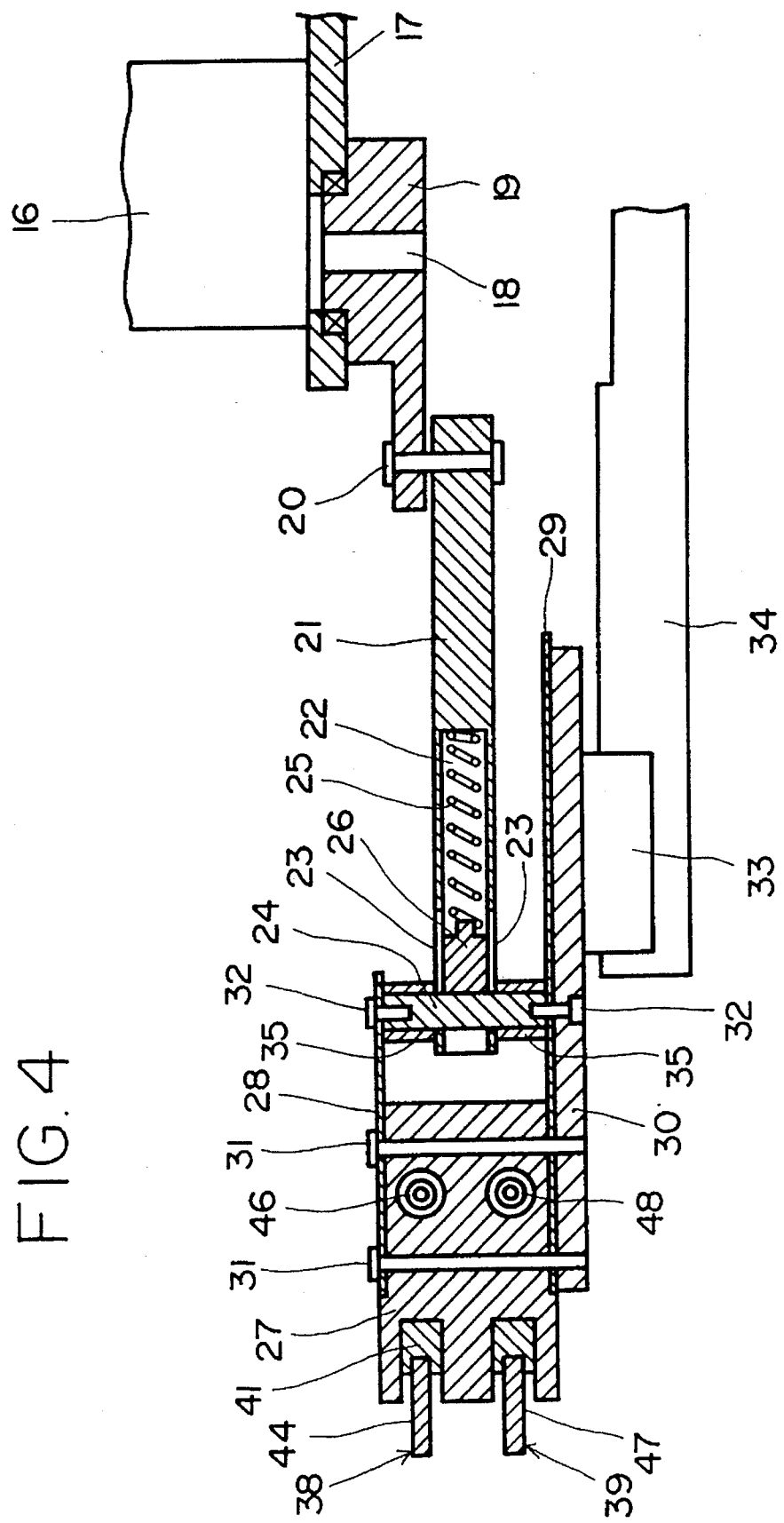
FIG. 4 is a longitudinal side elevation of the electrode assembly.
Figure 5:
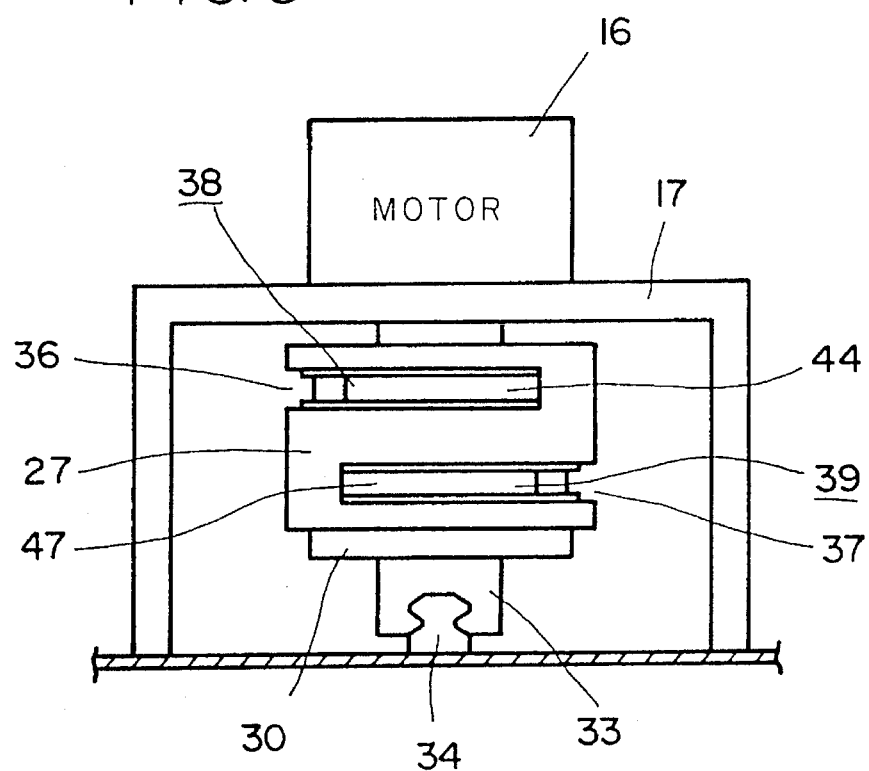
FIG. 5 is a front view of the electrode assembly.
Figure 6:
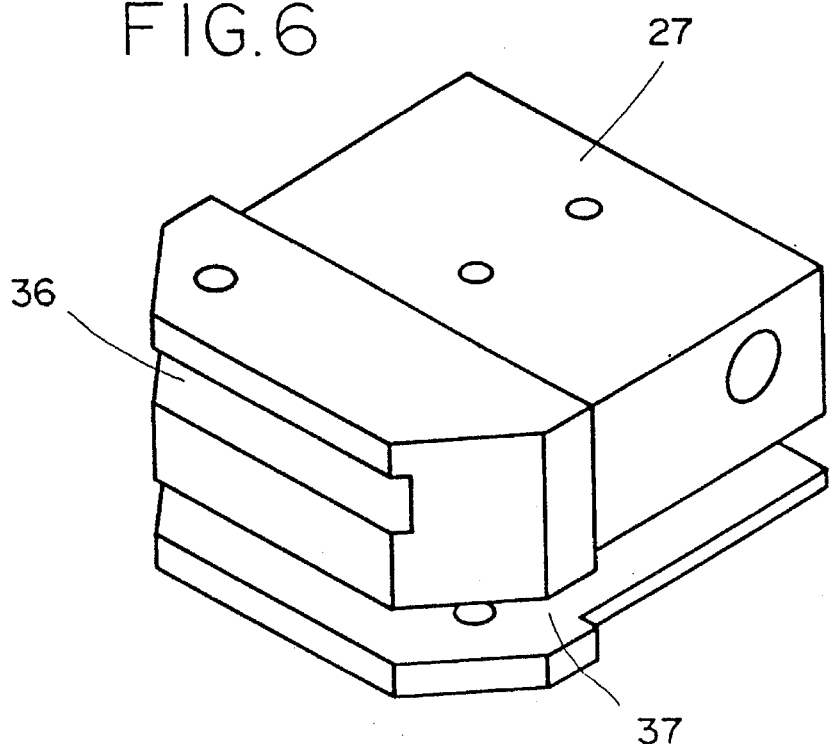
FIG. 6 is a perspective of a holder.
Figure 7:
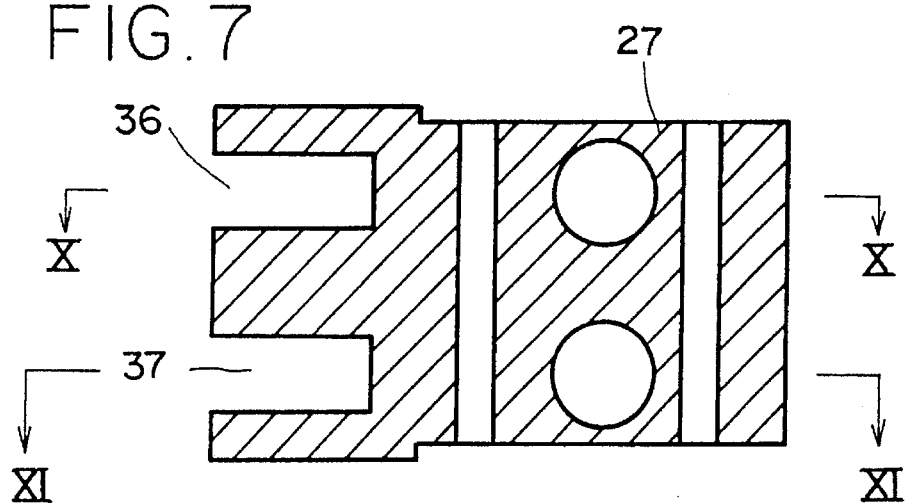
FIG. 7 is a section taken along line VII—VII of the holder shown in FIG. 10.
Figure 8:
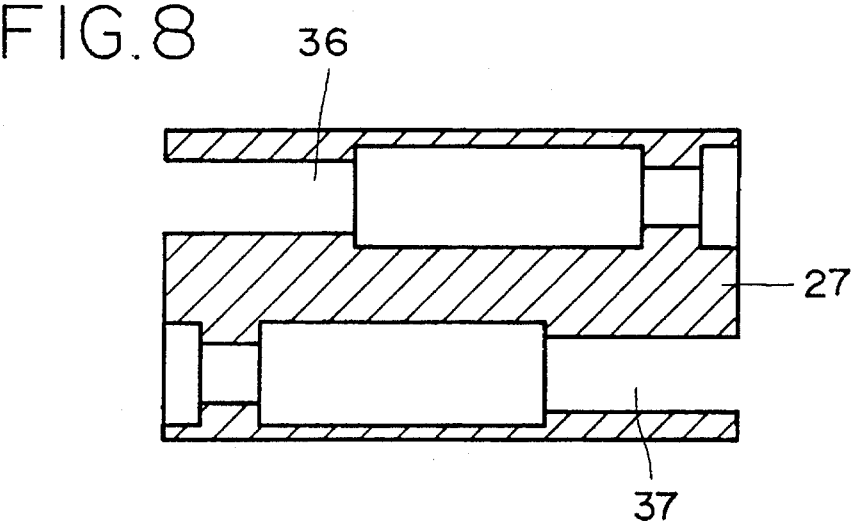
FIG. 8 is a section of the holder taken along line VIII—VIII in FIG. 10.
Figure 9:
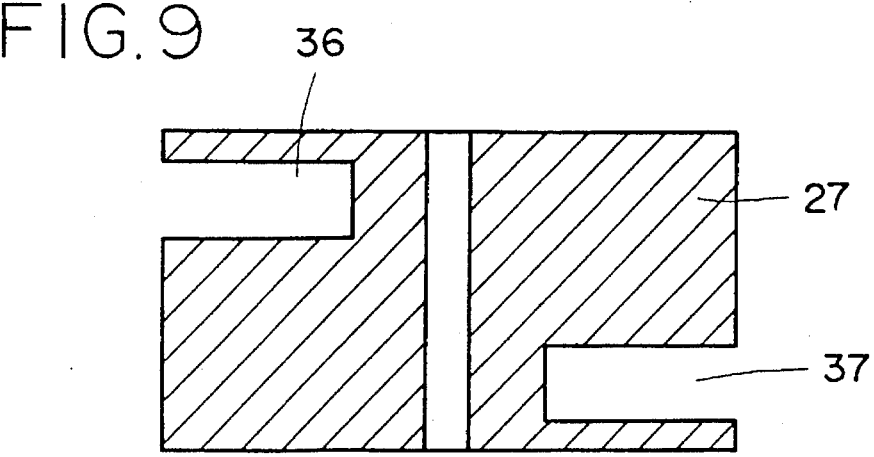
FIG. 9 is a section of the holder taken along line IX—IX in FIG. 10.
Figure 10:
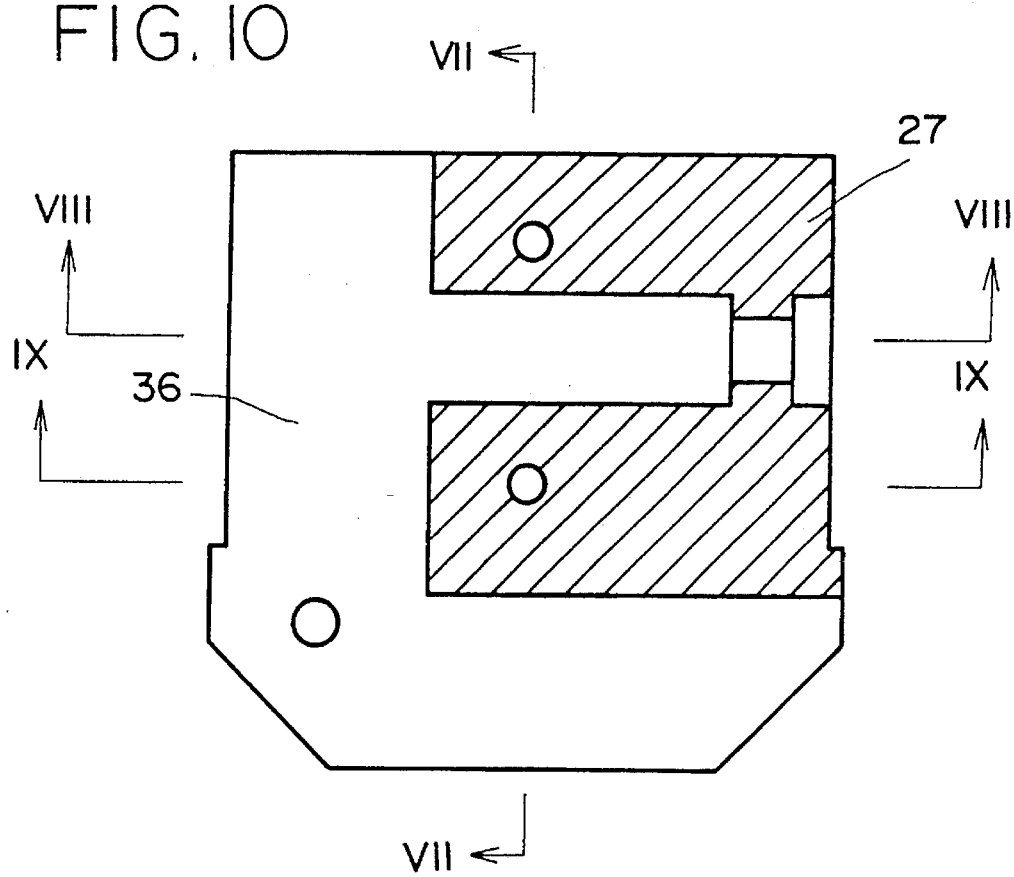
FIG. 10 is a section of the holder taken along line X—X in FIG. 7.
Figure 11:
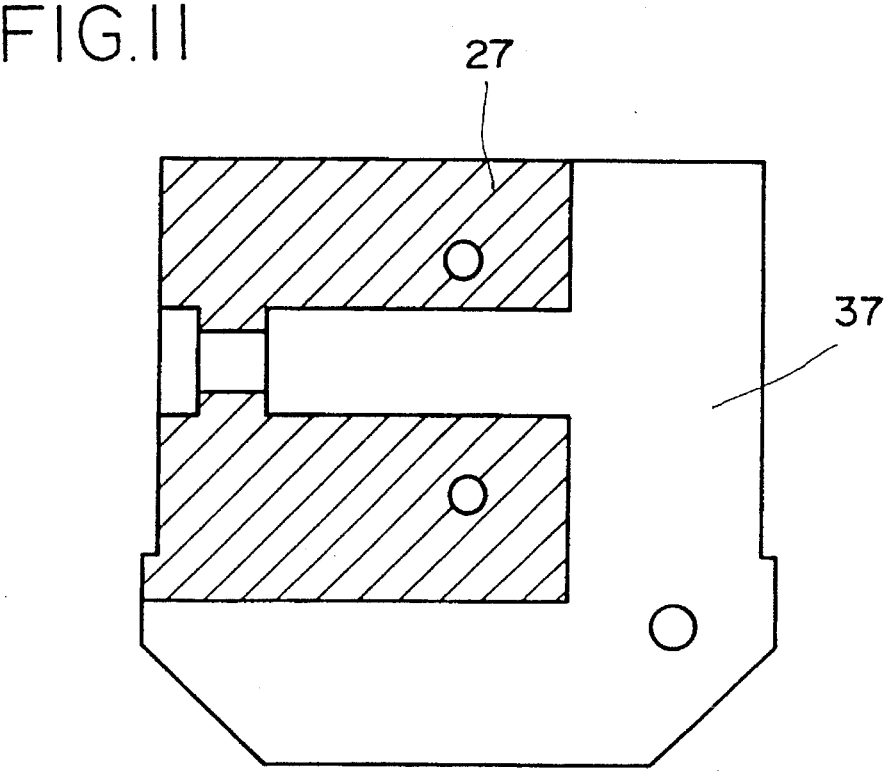
FIG. 11 is a section of the holder taken along line XI—XI in FIG. 7.

The electrode assembly shown in FIG. 3 has a holder 27 provided with an upper cover plate 28 and lower back plate 29. A base plate 30 is placed on bottom face of the back plate 29. These holder 27, cover plate 28, back plate 29 and base plate 30 are secured by pin 31. The shaft 24 is secured between cover plate 28 and back plate 29 by pin 32. A spacer 35 is placed around the shaft 24.

A guide rail 34 is secured to the frame body 17, and a slide rail 33 slidably engaged with the guide rail 34 is secured to the bottom face of the base plate 30.

The holder 27 is made of insulating material and has a pair of concave portions 36 and 37 separated at a predetermined distance in an up-and-down direction as shown in FIG. 5 to FIG. 11. As shown clearly in FIG. 10 and FIG. 11, respective concave portion 36 and 37 have about L shape and symmetrically formed.

Figure 12:
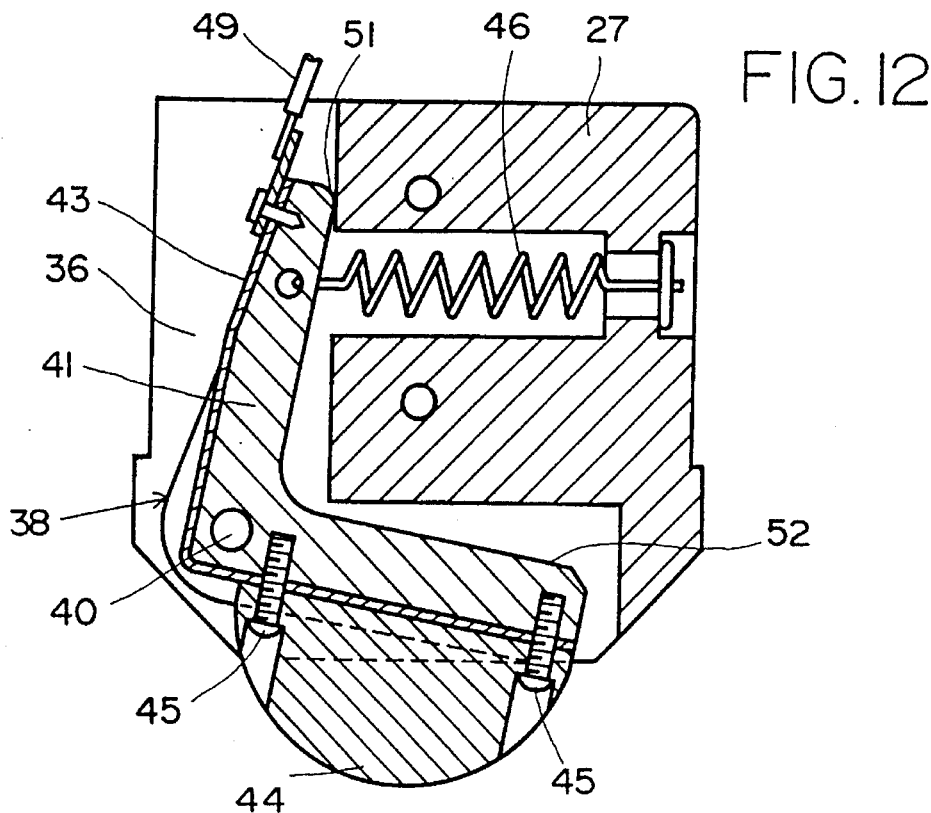
FIG. 12 is a section showing the electrode unit placed in a space of the holder.
Figure 13:
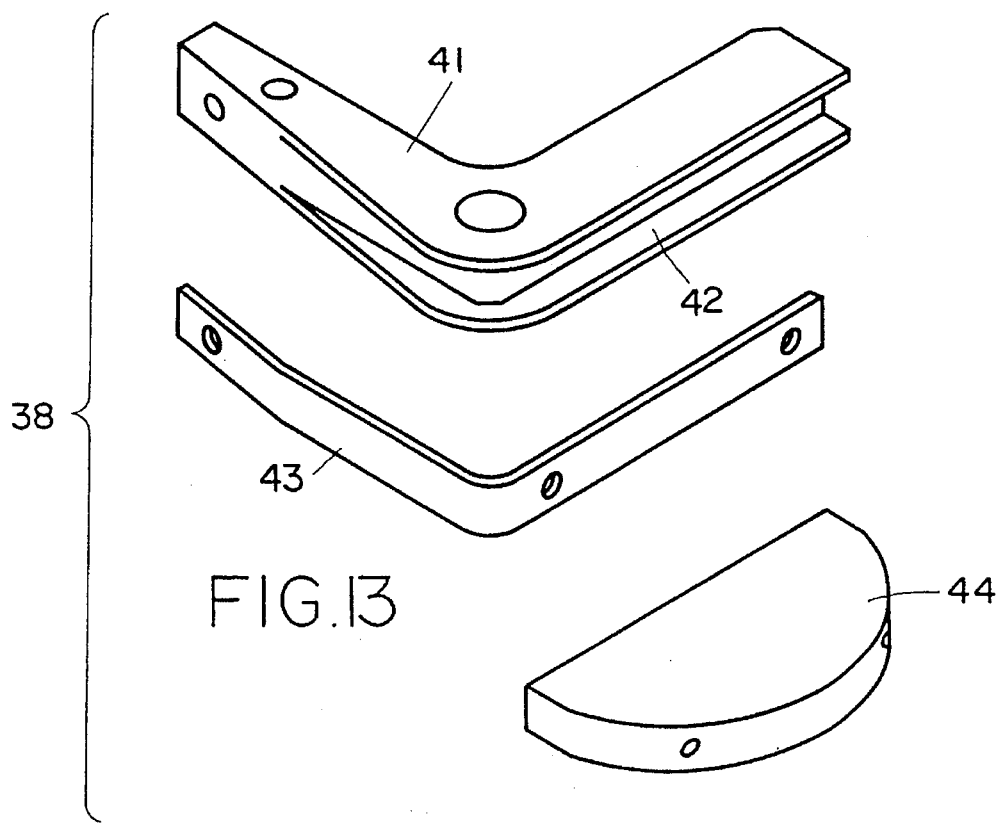
FIG. 13 is an exploded perspective of the electrode unit.

The concave portions 36 and 37 have electrode units 38 and 39, respectively attached thereto. FIG. 12 shows in detail the electrode unit 38 attached to the concave portion 36 of the holder 27. The electrode unit 38 consists of a L shape lever 41 rotatably journalled with the holder 27 by a shaft 40, a electric-conductive connector 43 intimately contacting with outer peripheral face 42 of the lever 41, and an arc-like electrode member 44 secured to outer periphery of the connector 43. They are mutually connected by screw 45. The electrode unit 38 journalled with the holder 27 by the shaft 40 is urged so as to protrude outside the electrode member 44 by spring 46.

Construction of the electrode unit 39 placed in the concave portion 37 of the holder 27 is substantially the same as that of the electrode unit 38, so that no explanation is given to the electrode unit 39. The electrode unit 39 and other electrode unit 38 are symmetrically placed, and the former unit 39 is urged by a spring 48 so as to protrude the electrode member 47 outside as shown in FIG. 4.

Cords 49 and 50 connect the electrode unit 38 and electrode unit 39 to power unit 14.

Operation of the charging apparatus for driverless transporting vehicle will be explained.

When electrical level of the battery 5 lowers to one less than that predetermined, the vehicle 1 automatically runs to a place by the charging apparatus 12 and stops there. As shown in FIG. 2, when communication portion 9 of the vehicle 1 and another communication portion 13 of the charging apparatus 12 confront to each other, data exchange or communication is carried out between both the communication portions 9 and 13 by suitable means, for example infrared ray beam. When predetermined conditions are satisfied, motor 16 of charging apparatus 12 rotates rotary arm 19, then the electrode assembly 15 connected to the rotary arm 19 through link 21 is guided by guide rail 34 and pushed along arrow-X direction coming in contact with charging terminal 11 of the vehicle 1.

Figure 14:
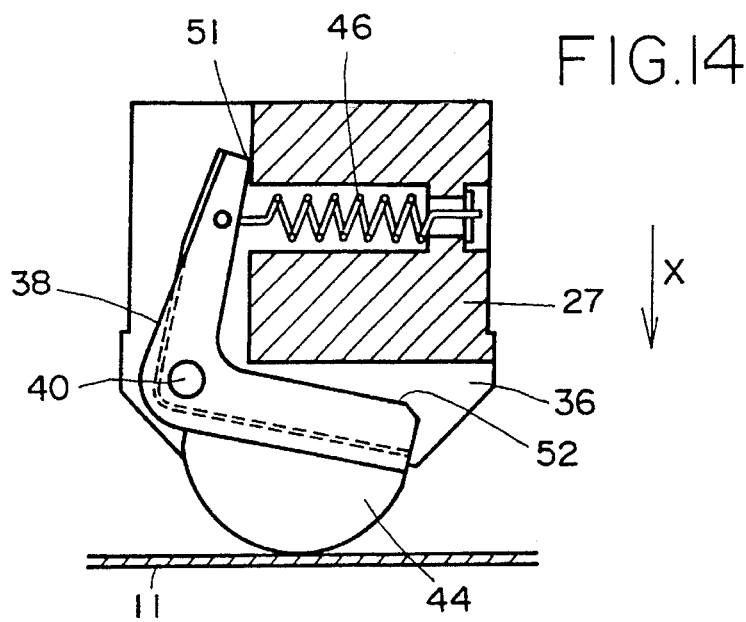
FIG. 14 is an explanation view of the electrode unit coming in contact with charging terminal.
Figure 15:
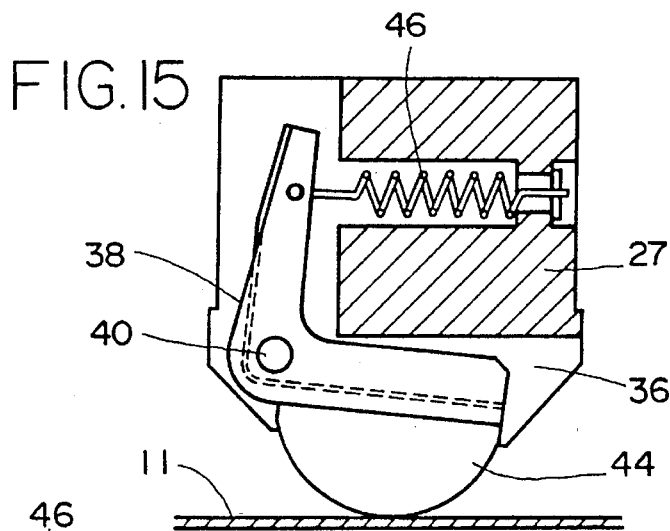
FIG. 15 is an explanation view of the electrode unit rotated after contacting with charging terminal.

FIG. 14 depicts an instant when the electrode member 44 comes in contact with terminal 11 of the vehicle 1. In this condition, the electrode unit 38 rotates clockwise due to resiliency of the spiring 46 until end portion 51 of the electrode unit 38 comes in contact with holder 27, thereby it is said that the electrode member 44 extrudes at most along an arrow-X direction. When the holder 27 of the electrode assembly 15 further rotates from the condition shown in FIG. 14 along an arrow-X direction owing to function of the motor 16, the electrode unit 38 comes in contact with terminal 11 and rotates around the shaft 40 against elasticity of spring 46 (see FIG. 15). At last, the end portion 52 comes in contact with holder 27 as shown in FIG. 16.

As described above, when the electrode unit 38 rotates around the shaft 40, outer faces of electrode member 44 and terminal 11 rub with each other clarifying them. As a result, the electrode member 44 and terminal 11 are always kept in contact condition with good conductive condition.

Figure 16:
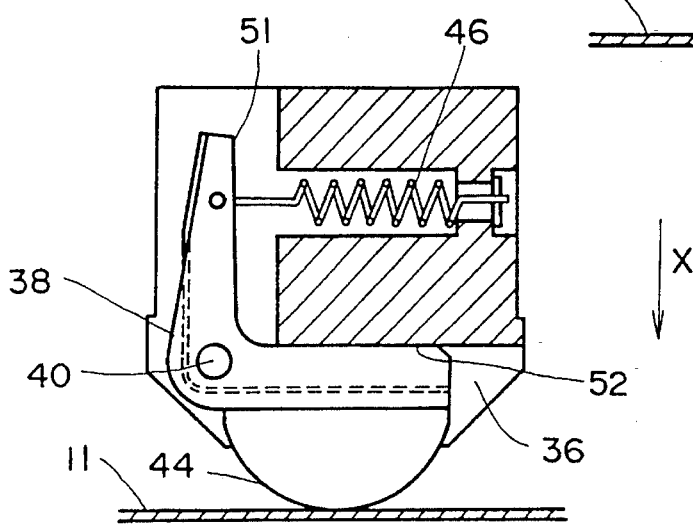
FIG. 16 is an explanation view of electrode unit after its rotation.
Figure 17:
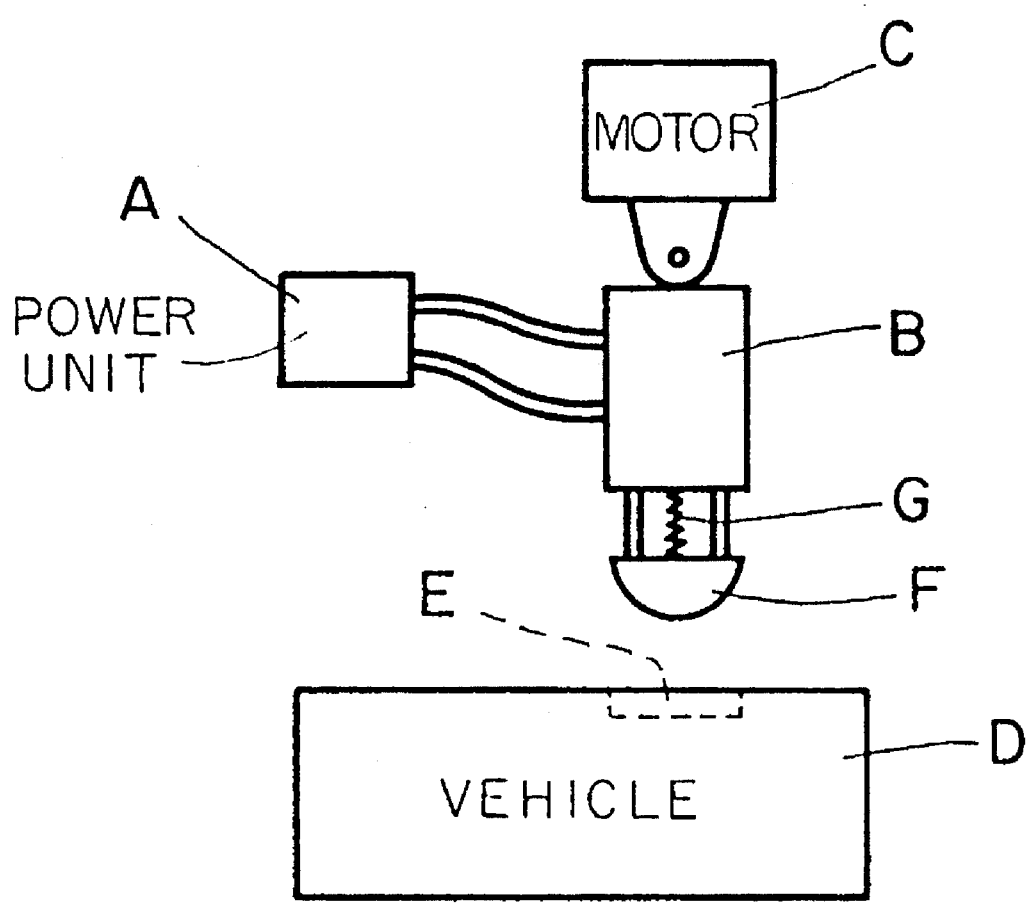
FIG. 17 is a charging apparatus according to the prior art.

The motor 16 is adapted to excessively rotate a little from the condition shown in FIG. 16. Consequently, the link 21 moves along an arrow-X direction. As a result, spring 25 placed between link 21 and holder 27 is compressed. After halting of motor 16, elasticity of the spring 25 presses the electrode member 44 to the terminal 11.

Cleaning function of electrode member 44 and terminal 11 is kept carried out after charging of the battery is completed and while the electrode assembly 15 returns along a counter arrow-X direction.

The foregoing description of the specific embodiments will so fully reveal the general nature of the invention that others can, by applying current knowledge, readily modify and/or adapt for various applications such specific embodiments without departing from the generic concept. For example, the electrode members 44 and 47 may be formed in shapes of flat plate and terminal 11 may be shaped in arc-like, and either electrode member can rotate.

What is claimed is:

1. A charging apparatus for charging a driverless transporting vehicle having an electrical contact terminal for charging and adapted to automatically run along a guide tape installed on a floor, the charging apparatus comprising:

a power unit;

an electrode assembly electrically connected to said power unit and slidable along a predetermined direction toward the vehicle;

a motor for sliding said electrode assembly along the predetermined direction;

an electrode unit rotatably journalled with the electrode assembly by a first shaft and contactable with the terminal for charging said vehicle; and a spring for rotating said electrode unit around said first shaft and extending it outside of the electrode assembly, wherein when the electrode assembly is slid by the motor, the electrode unit comes in contact with the terminal of the vehicle and rotates around the first shaft against said spring, and maintains contact with the terminal.

2. The charging apparatus according to claim 1, wherein a terminal- contacting portion of the electrode unit has an arc-like shape.

3. A charging apparatus for charging a driverless transporting vehicle having an electrical contact terminal for charging and adapted to automatically run along a guide tape installed on a floor, the charging apparatus comprising:

a power unit;

an electrode unit electrically connected to said power unit and slidable along a predetermined direction toward the vehicle;

a motor for sliding the electrode assembly along the predetermined direction;

a charging terminal rotatably journalled with the vehicle by a first shaft, and a spring for rotating said electrode unit around said first shaft and extending it outside of the electrode assembly, wherein when the electrode assembly is slid by the motor, the electrode unit comes in contact with the charging terminal, and when the electrode unit further slides, the charging terminal comes in contact with the electrode unit, rotates around the first shaft against elasticity of the spring, and maintains contact with the terminal.

4. The charging apparatus according to claim 3, wherein a terminal- contacting portion of the charging terminal has an arc-like shape.

* * * * *